United States Patent [19]

Pfenninger et al.

[11] 4,232,747

[45] Nov. 11, 1980

[54] FARM IMPLEMENT AND CONTROL STRUCTURE FOR WING SECTIONS THEREOF

[75] Inventors: Billy J. Pfenninger; F. Harrison Stansel, both of Hutchinson, Kans.

[73] Assignee: Krause Plow Corporation, Hutchinson, Kans.

[21] Appl. No.: 930,494

[22] Filed: Aug. 3, 1978

[51] Int. Cl.³ .................................. A01B 73/00
[52] U.S. Cl. .................................. 172/311; 172/501
[58] Field of Search .............. 172/126, 311, 456, 501, 172/662; 56/5, 6, 228, 385

[56] References Cited

U.S. PATENT DOCUMENTS

| | | | |
|---|---|---|---|
| 3,250,333 | 5/1966 | Day | 172/126 |
| 3,321,028 | 5/1967 | Groenke | 172/311 |
| 3,460,631 | 8/1969 | Friesen et al. | 172/311 |
| 3,473,302 | 10/1969 | Caldwell | 56/6 |
| 3,568,777 | 3/1971 | Hook | 172/311 X |
| 3,650,096 | 3/1972 | Caldwell | 56/7 |
| 3,650,333 | 3/1972 | Fueslein | 172/311 |
| 3,669,195 | 6/1972 | Green et al. | 172/311 |
| 3,692,121 | 9/1972 | Kenney | 172/456 |
| 3,693,724 | 9/1972 | Fueslein et al. | 172/456 |
| 3,783,951 | 1/1974 | Gugin | 172/311 |
| 3,797,580 | 3/1974 | Roth | 172/311 |
| 3,799,272 | 3/1974 | Watson | 172/126 |
| 3,814,191 | 6/1974 | Tilbury | 172/311 |
| 3,828,860 | 8/1974 | Poland | 172/311 |
| 3,844,358 | 10/1974 | Shuler et al. | 172/311 |
| 3,941,194 | 3/1976 | Orthman | 172/311 |
| 3,948,327 | 4/1976 | Parker et al. | 172/311 |
| 4,023,623 | 5/1977 | Anderson | 172/311 |
| 4,050,523 | 9/1977 | Poland | 172/311 |
| 4,116,282 | 9/1978 | Hansen | 172/311 |

FOREIGN PATENT DOCUMENTS 1158304  11/1963  Fed. Rep. of Germany .......... 172/456

*Primary Examiner*—Richard T. Stouffer
*Attorney, Agent, or Firm*—Schmidt, Johnson, Hovey & Williams

[57] ABSTRACT

A farm implement has a number of normally horizontal sections for supporting ground-engaging tools, hingedly interconnected such that the outer sections may be folded upwardly and inwardly to a reduced width for transport and storage. A folding assembly separate from the hinges includes a hydraulic piston and cylinder power unit coupled with a lift link that is pivotally connected to a force-transmitting lever which, in turn, acts against a fulcrum during the folding operation. The fulcrum has the second function of serving as one of a pair of limiting stops in a lost motion arrangement for the lever which permits the foldable section to rise and fall in response to uneven terrain. The lever is supported through a trunnion by a carriage which, during folding, is first tilted by the lever to align the trunnion with slotted trunnion guide tracks and then shifted within a slide box by the power unit acting through the trunnion as the last phase of the folding operation takes place.

19 Claims, 13 Drawing Figures

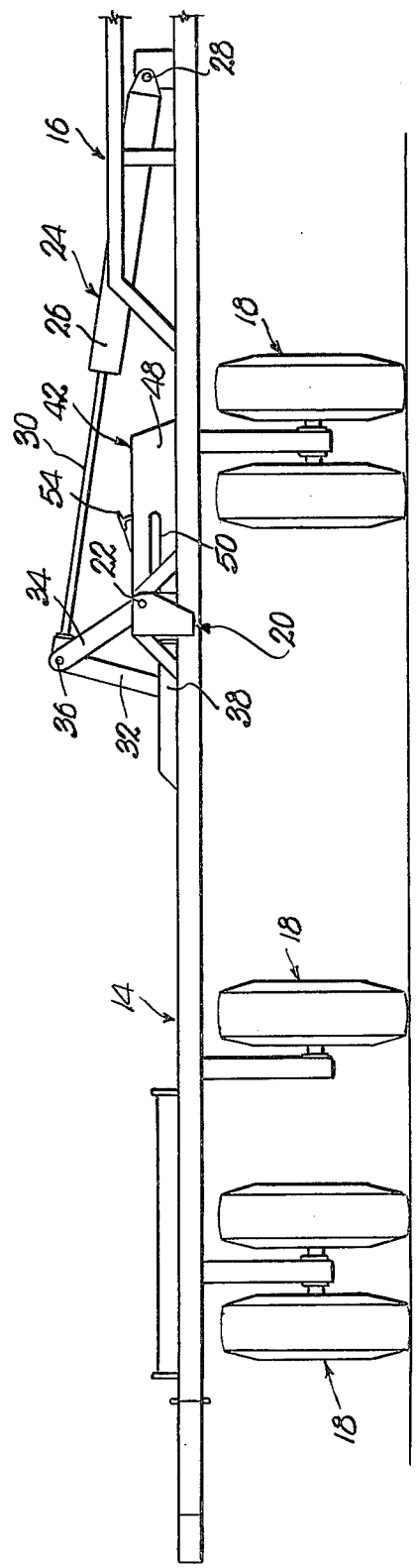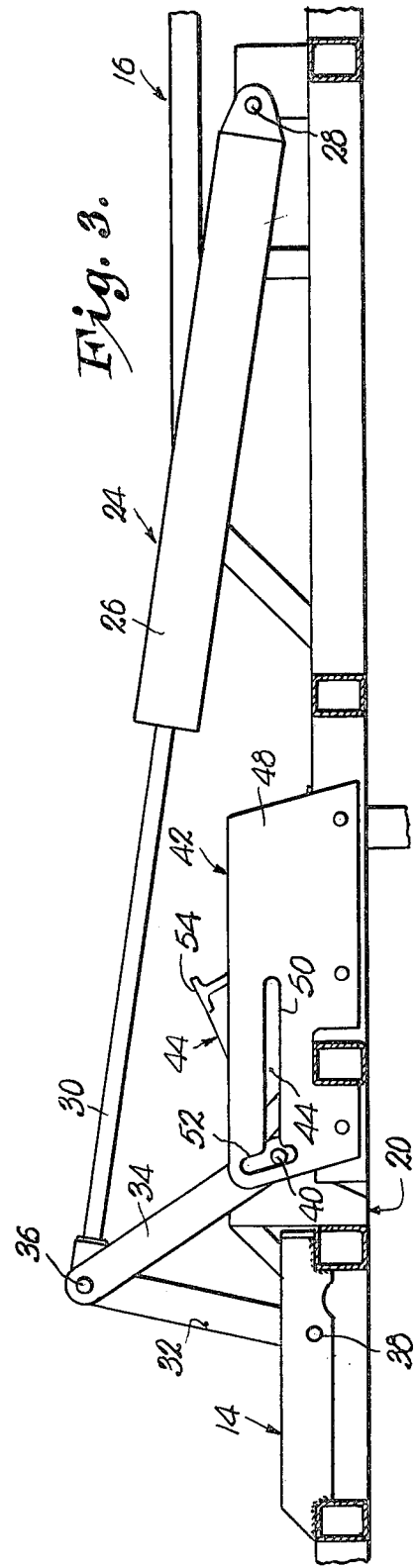

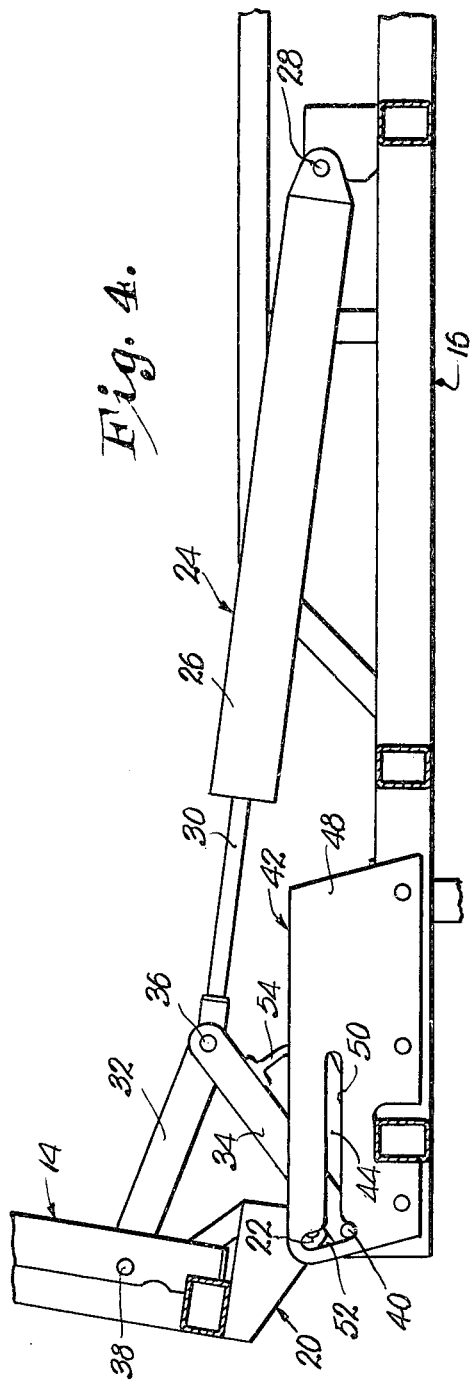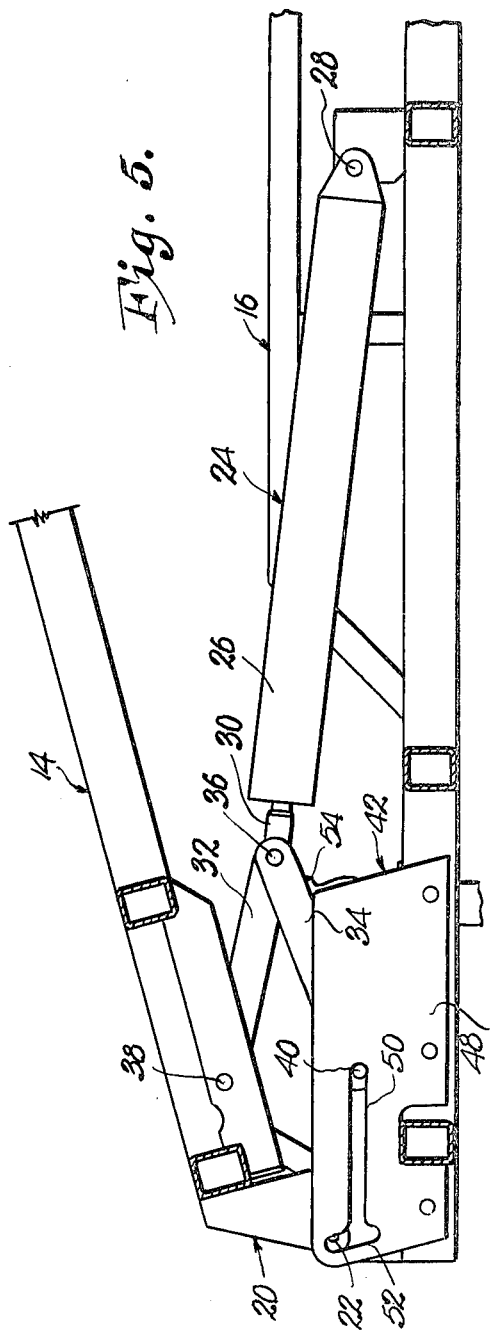

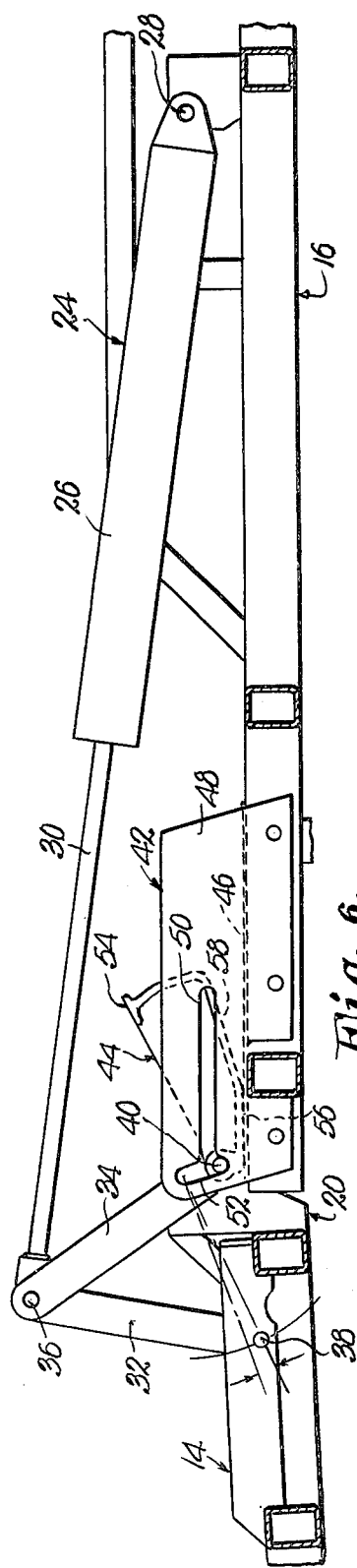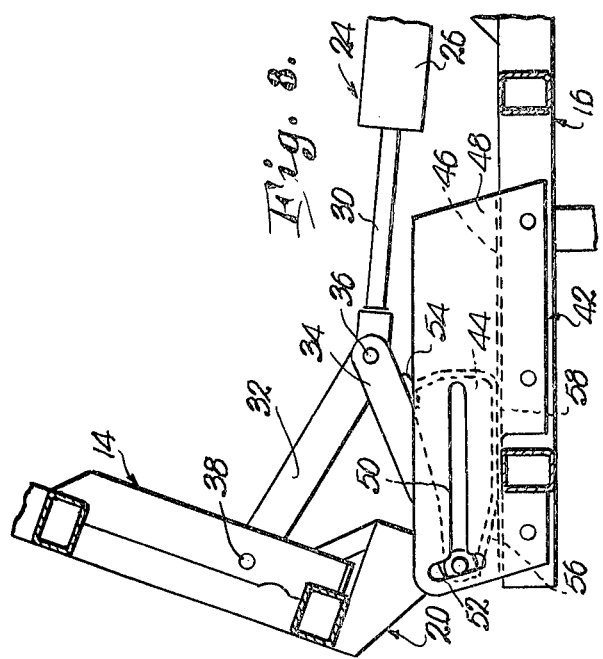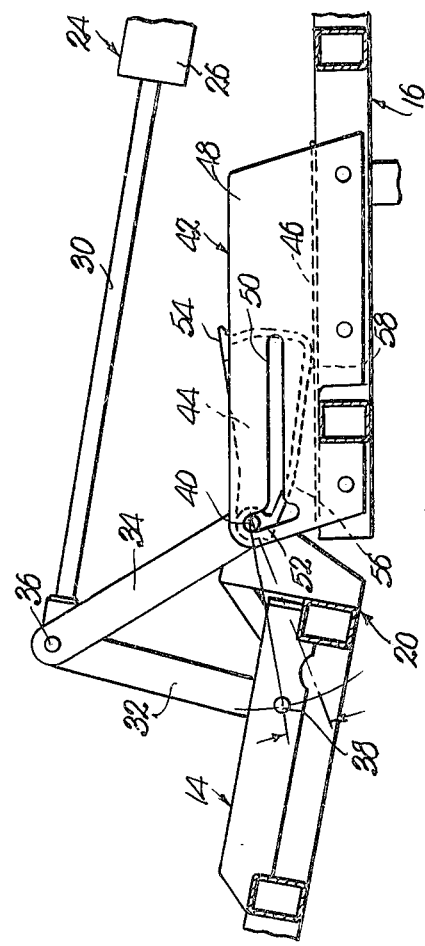

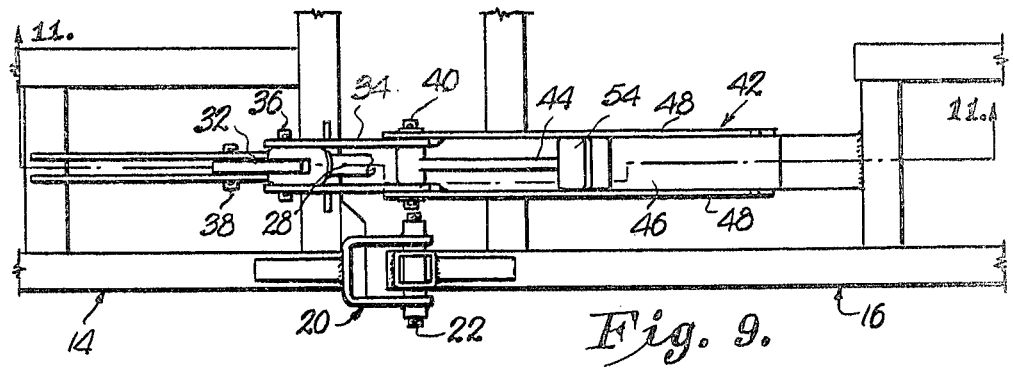
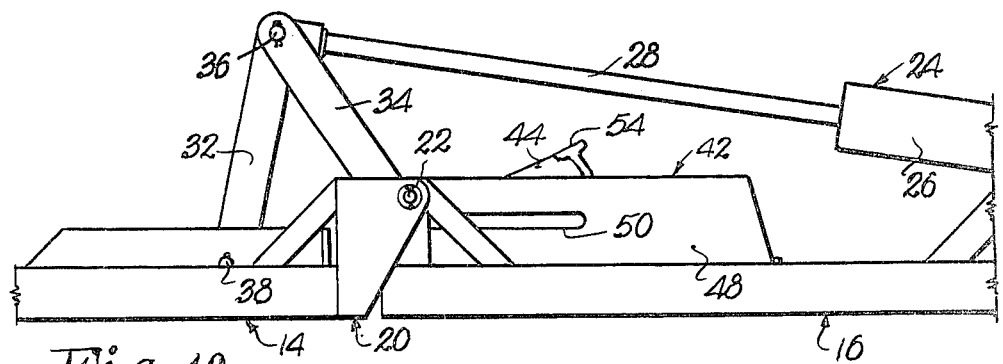
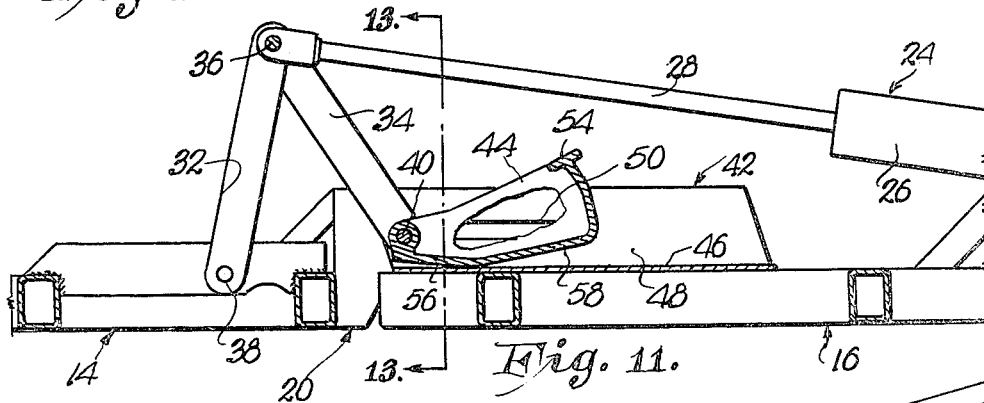
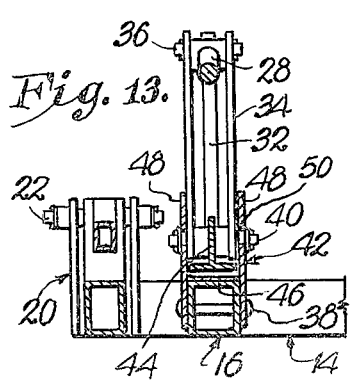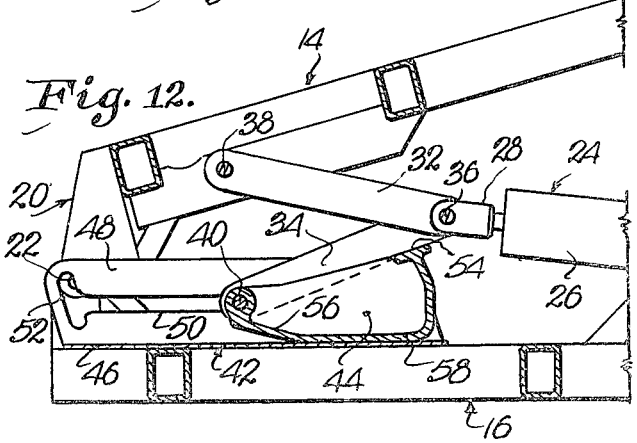

FARM IMPLEMENT AND CONTROL STRUCTURE FOR WING SECTIONS THEREOF

BACKGROUND OF THE INVENTION

In the field of farm implements relating especially to tillage such as disks, cultivators, and the like, there is a continuing demand for increased lengths which presents problems when the implements are to be stored and transported over the road, across bridges and through opened gates. The problems are solved by sectionalizing the implements to present a main section and several wing sections all hingedly interconnected. The winged sections are foldable with respect to the main section through use of hydraulic piston and cylinder assemblies. Examples of implements coming within such general classification are disclosed in the following U.S. Letters Patent:

| | | |
|---|---|---|
| 3,250,333 | 3,669,195 | 3,814,191 |
| 3,321,028 | 3,692,121 | 3,828,860 |
| 3,460,631 | 3,693,724 | 3,844,358 |
| 3,473,302 | | 3,941,194 |
| 3,568,777 | 3,783,951 | 3,948,327 |
| 3,650,096 | 3,797,580 | 4,023,623 |
| 3,650,333 | 3,799,272 | |

Among the above identified patents, the use simply of upstanding brackets rigid to the sections, separate from the hinges and pivotally interconnected by the piston-cylinder power units is exemplified by U.S. Pat. Nos. 3,650,096; 3,844,358 and 3,948,327.

The above listed patents also illustrate the alternate suggestion of coupling the hydraulic unit directly or indirectly with the hinge plates, straps or lugs which articulate the section, e.g. U.S. Pat. Nos. 3,941,194; 3,948,327 and 4,023,623.

On the other hand, there are many prior illustrations of using various arrangements of link, levers, arms, bars and the like as a means of coupling the power units with the sections to be relatively folded thereby, as shown, for instance, by the following patents:

| | | |
|---|---|---|
| 3,568,777 | 3,797,580 | 3,828,860 |
| 3,692,121 | 3,799,272 | 3,948,327 |
| 3,783,951 | 3,814,191 | 4,023,623 |

In order to permit the wing sections to float, thereby compensating for irregularities in the terrain, lost motion connections of various types have heretofore been suggested as seen in U.S. Pat. Nos. 3,797,580; 3,828,860 and 3,948,327.

SUMMARY OF THE INVENTION

A mechanical advantage is gained by coupling a force-transmitting lever with the power unit and with the wing section lift link and having the lever arranged to shift in one direction, thereby providing wing floatation, turn about a fulcrum during the initial raising of the wing section and shift in still another direction during the final stage of the folding operation.

The lever is swingable on a carriage through use of a trunnion adapted to move up and down within guide slots toward and away from the fulcrum with which it is engageable. While folding, the lever tilts the carriage to align the trunnion with clearance slots whereupon the lever shifts the carriage within a slide box laterally away from the zone of the fulcrum.

In the drawings:

FIG. 2 is a rear elevational view thereof;

FIG. 3 is an enlarged fragmentary rear elevational view partially in section similar to FIG. 2 showing the positions of various parts when the wing section are in their normal, horizontal working position;

FIG. 4 is a view similar to FIG. 3 but showing the position of components after the outer wing section has been initially raised toward its fully folded condition;

FIG. 5 is a view similar to FIGS. 3 and 4 but showing the outer wing section in its fully folded condition over the inner wing section;

FIG. 6 is a view similar to FIGS. 3,4, and 5 but showing the position of component parts when the outer wing section has swung down slightly relative to the inner wing section in response to a depression in the terrain;

FIG. 7 is a view similar to FIGS. 3-6 further fragmented, and shown the position of component parts when the outer wing section swings upwardly with respect to the inner wing section in response to a rise in the terrain;

FIG. 8 is a view similar to FIG. 4, further fragmented, illustrating the position of components after further retraction of the extensible power mean beyond that illustrated in FIG. 4;

FIG. 9 is an enlarged plan view showing certain of the components illustrated in FIGS. 1-8, parts being broken away for clearness;

FIG. 10 is an enlarged fragmentary view similar to FIG. 2;

FIG. 11 is a fragmentary view similar to FIG. 10 with parts broken away and in section to reveal details of construction;

FIG. 12 is an enlarged fragmentary view similar to FIG. 5, parts being broken away and in section for clearness; and FIG. 13 is a fragmentary cross sectional view taken on line 13—13 of FIG. 11.

Figure 1:
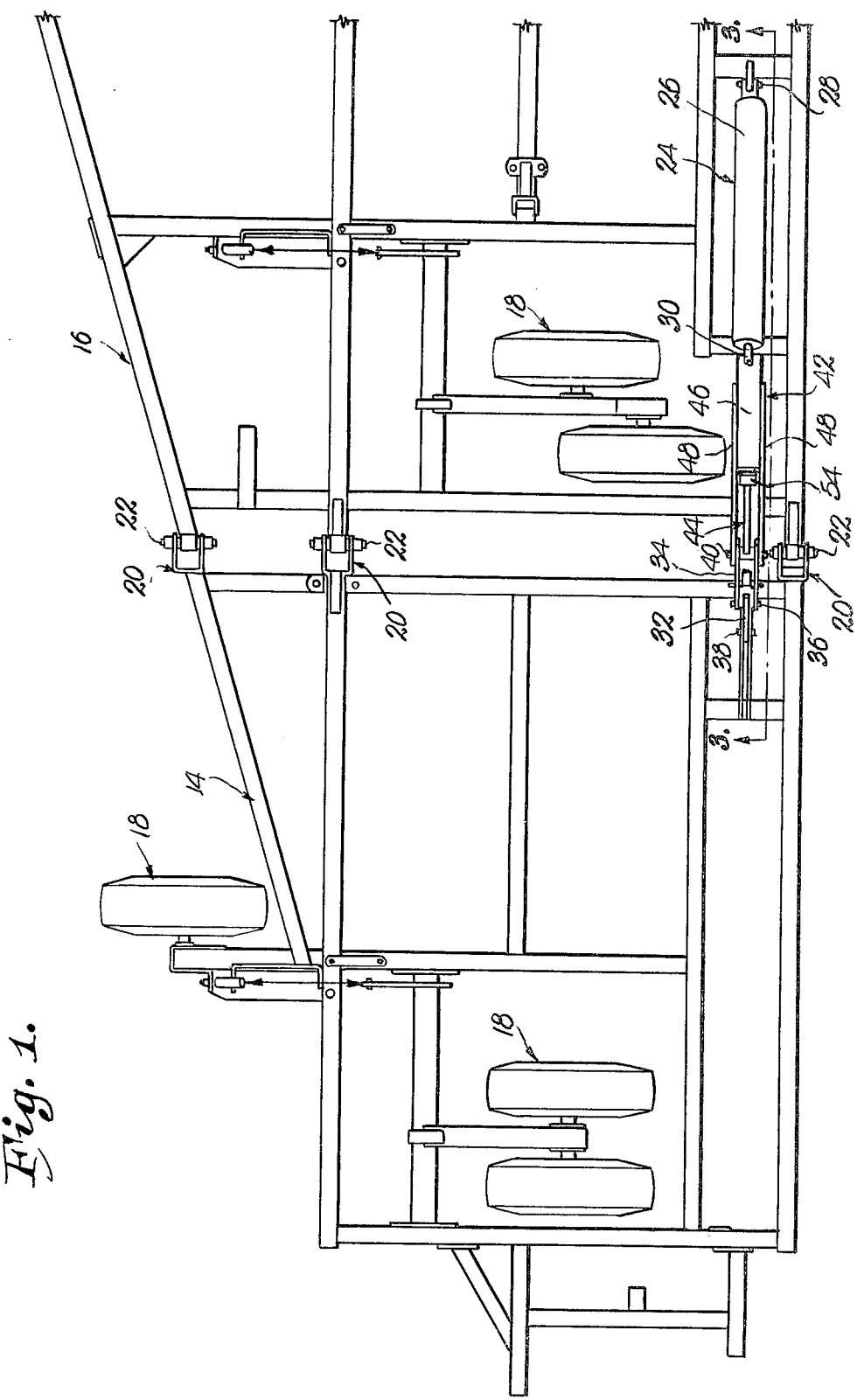
FIG. 1 is a fragmentary plan view of a farm implement illustrating the control structure for one of a pair of wings made in accordance with our present invention.

There is illustrated in the drawings but two wing sections 14 and 16 of a multi-section farm implement and the manner of folding the wing 14 to its transport-storage position [FIGS. 5 and 12] above the wing section 16. The structure for permitting the wing 16 to be thereupon folded with respect to an adjacent main section (not shown) forms no part of the present invention. Suitable ground wheels 18 support the wings 14 and 16, and each is adapted, in turn, to support tillage tools or the like such as disks or cultivator shovels (not shown). An articulated joint is formed between the wings 14 and 16 by a number of space hinges 20 whose hinge pins 22 are aligned fore and aft of the implement in a normally horizontal plane.

The entire operating assembly constituting the invention is located just forwardly but separate from the rearmost hinge 20 and includes a power device 24 in the nature of a double acting, hydraulic cylinder 26 having a pivotal connection 28 with the wing 16, and an extensible piston rod 30.

A lift link 32 and a force-transmitting lever 34, normally extending upwardly from the wings 14 and 16 respectively, converge toward a pivot 36 which connects them to the outer end of the rod 30. The link 32 has a pivotal attachment 38 to the wing 14 and the lever 34 has a trunnion 40 at its lower end.

An open top slide box 42 for a reciprocable carriage 44 mounted on the wing 16 has a carriage-supporting base 46 and a pair of upstanding sides 48. The trunnion 40 passes through the carriage 44 and sides 48, each side 48 having an essentially T-shaped slot for clearing and guiding the trunnion 40. Each slot has a generally horizontal length 50 communicating at one of its ends with an upright branch 52.

The carriage 44 has a lever-actuated pedal 54 and a generally V-shaped lower face which includes a rest portion 56 and a slide portion 58 angularly offset from the portion 56.

OPERATION

In normal use the wing 14 is horizontally disposed and extends outwardly from the wing 16 as shown in FIGS. 1-3 with the rod 30 extended, with the trunnion 40 intermediate its path of reciprocation within the branch 52 (FIG. 3) and with the carriage 44 resting on the base 46 at the line of merger between the portions 56 and 58 as seen in FIG. 11. But the wing 14 is free to float up and down in response to uneven terrain about the pins 22 within the upper and lower limits of travel of the trunnion 40 in the branch 52.

The upper closed end of the branch 52 serves as a stop for the trunnion 40, but the extent of downward swinging movement of the wing 14 is also limited by the rod 30 reaching the outer end of its stroke. By the same token, while the lower closed end of the branch 52 serves as another stop for the trunnion 40, the extent of upward swinging movement of the wing 14 is also limited by the fact that fluid pressure is retained in that end of the cylinder 26 adjacent the pivot 28.

The lower end of the branch 52 serves the additional function of acting as a fulcrum for the trunnion 40 about which the lever 34 turns during the initial lifting of the section 14 by the power device 24 toward the folded position of the wing 14 above the wing 16 as shown in FIGS. 5 and 12.

As seen in FIG. 6, when the rod 30 begins to retract, exerting a pull on the link 32 and the lever 34 through the pivot 36 the trunnion 40 shifts downwardly within the branch 52 until it seats against the fulcrum presented by the lower end of the branch 52. This tilts the carriage 44 until its portion 56 rests flatly against the base 46.

Continued retraction of the rod 30 pulls on the link 32 and the wing 14, causing the wing 14 to swing about the pins 22 and the lever 34 to swing on the fulcrum at the trunnion 40 to the position shown in FIG. 4 where the lever 34 engages the pedal 54. The lever 34 then pushes downwardly on the pedal 54 to tilt the carriage 44 on the base 46 about the line of merger between the portions 56 and 58. This raises the portion 56 off the base 46, moves the portion 58 flatly against the base 46 and raises the trunnion 40 within the slot branches 52 to a position aligned with the slot lengths 50, all as depicted in FIG. 8.

At this point, the carriage 44 begins to move away from the joint between the wings 14 and 16, the portion 58 slides along the base 46, the trunnion 40 is guided along the lengths 52 and the link 32 and the lever 34, in their laid over position, shift toward the cylinder 26 and the wing 14 becomes fully folded above the wing 16 as shown in FIGS. 5 and 12.

Any suitable shelf or standard on the wing 16 (not shown) may be provided in the conventional manner as a support for the wing 14 when the rod 30 is thus fully retracted. Moreover, in the event the wings 14 and 16 form part of a five section implement, for example, the attitudes of the sections will be essentially the same as illustrated in U.S. Pat. No. 3,844,358 above refered to.

We claim:

1. In a farm implement:
   a pair of normally horizontal sections for supporting ground-engaging tool means;
   hinge means interconnecting the sections for up and down swinging movement of one of said sections;
   a lift link pivotally attached to said one section and normally extending upwardly therefrom;
   an extensible device pivotally interconnecting said link and the other of said sections for raising the one section about said hinge means to a transport and storage position;
   a force-transmitting lever normally extending upwardly from said other section and provided with a trunnion;
   means pivotally coupling the lever with the link;
   a fulcrum on said other section disposed for engagement by said trunnion and about which the lever turns during operation of said device; and
   means guiding said trunnion for movement toward and away from said fulcrum as the one section rises and falls in response to uneven terrain.

2. The invention of claim 1; and stop means for said trunnion spaced from the fulcrum for limiting the extent of fall of said one section.

3. The invention of claim 1; and track means disposed to receive the trunnion from said guide means for movement of the trunnion to a position during retraction of said device for folding of the one section into overlying relation to the other section.

4. The invention of claim 3; and a carriage tiltable on said other section for aligning the trunnion with said track means during said retraction of the device.

5. The invention of claim 4, said carriage being disposed for tilting by said lever.

6. The invention of claim 4, said carriage pivotally supporting the trunnion.

7. The invention of claim 6; and means on the other section supporting the carriage for reciprocable movement along a path of travel parallel with said track means.

8. In a farm implement:
   a pair of normally horizontal sections for supporting ground-engaging tool means;
   hinge means interconnecting the sections for up and down swinging movement of one of said sections;
   a lift link pivotally attached to said one section and normally extending upwardly therefrom;
   an extensible device pivotally interconnecting said link and the other of said sections for raising the one section about said hinge means to a transport and storage position;
   a force-transmitting lever normally extending upwardly from one other section and provided with a trunnion;
   means pivotally coupling the lever with the link; a trunnion-supporting carriage,
   said lever being swingable relative to the carriage in response to extension and retraction of said device; and means on said other section supporting the carriage for reciprocable movement during said extension and retraction of the device.

9. The invention of claim 8, said carriage-supporting means including means slidably receiving the carriage and provided with track means slidably receiving the trunnion.

10. In a farm implement:
a pair of normally horizontal sections for supporting ground-engaging tool means;
hinge means interconnecting the sections for up and down swinging movement of one of said sections;
a lift link pivotally attached to said one section and normally extending upwardly therefrom;
a carriage;
a force-transmitting lever pivotally attached to said carriage and normally extending upwardly therefrom;
said link and lever converging as their normally uppermost ends are approached; and
power means pivotally connected with the other of said sections and with said uppermost ends of the link and lever,
said carriage being supported by said other section for movement away from said one section as the power means swings the link and the lever to a position folding the one section into overlying relation to the other section.

11. The invention of claim 10, said other section being provided with means slidably receiving the carriage and including track means for said lever.

12. The invention of claim 11, said means slidably receiving the carriage being a channel member having a base upon which the carriage is reciprocably supported, and a pair of spaced sides between which the carriage is disposed.

13. The invention of claim 12, there being a trunnion pivotally connecting the lever with the carriage, said track means comprising trunnion-receiving slots in said sides.

14. The invention of claim 13, said slots being essentially T-shaped, presenting a horizontal and an upright branch, said trunnion being normally movable within the upright branches to permit rise and fall of the one section in response to uneven terrain.

15. The invention of claim 14, said carriage being tiltable on said base and having a pedal disposed for engagement by the lever during folding of the one section such that the lever tilts the carriage to a position aligning the trunnion with said horizontal branches of the slots.

16. In a farm implement:
a first tool-supporting section;
a second tool-supporting section;
an articulated joint between the sections;
a power device for lifting the first section and swinging the latter to a folded position overlying the second section;
means pivotally coupling one end of the power device with said second section, means pivotally connecting the opposite end of the power device with said first section,
said connecting means including:
a lift link provided with a normally lowermost end having pivot means connected with said first section, and
a force-transmitting lever having a normally uppermost end provided with a pivot pin connecting the lever with the normally uppermost end of the lift link,
said pivot pin pivotally connecting the opposite end of the power device with the lift link and the lever;
a reciprocable support underlying the lever;
guide means carried by the second section beneath the power device and disposed to guide the support for rectilinear reciprocable movement along the second section toward and away from said joint; and
a trunnion at the normally lowermost end of the lever pivotally connecting the latter with said support,
said guide means having a fulcrum beneath the trunnion about which the lever turns during initial lifting of the first section toward said folded position.

17. The invention of claim 16, the guide means having horizontal slot means clearing the trunnion during movement of the support along the guide means.

18. The invention of claim 17, said guide means having upright slot means clearing the trunnion for movement toward and away from said fulcrum prior to initial lifting of said first section.

19. The invention of claim 18, the horizontal slot means communicating with the upright slot means, said support having a pedal disposed for engagement by the lever and tilting thereby after said initial lifting of said first section to a position aligning the trunnion with the horizontal slot means.

* * * * *